116,902

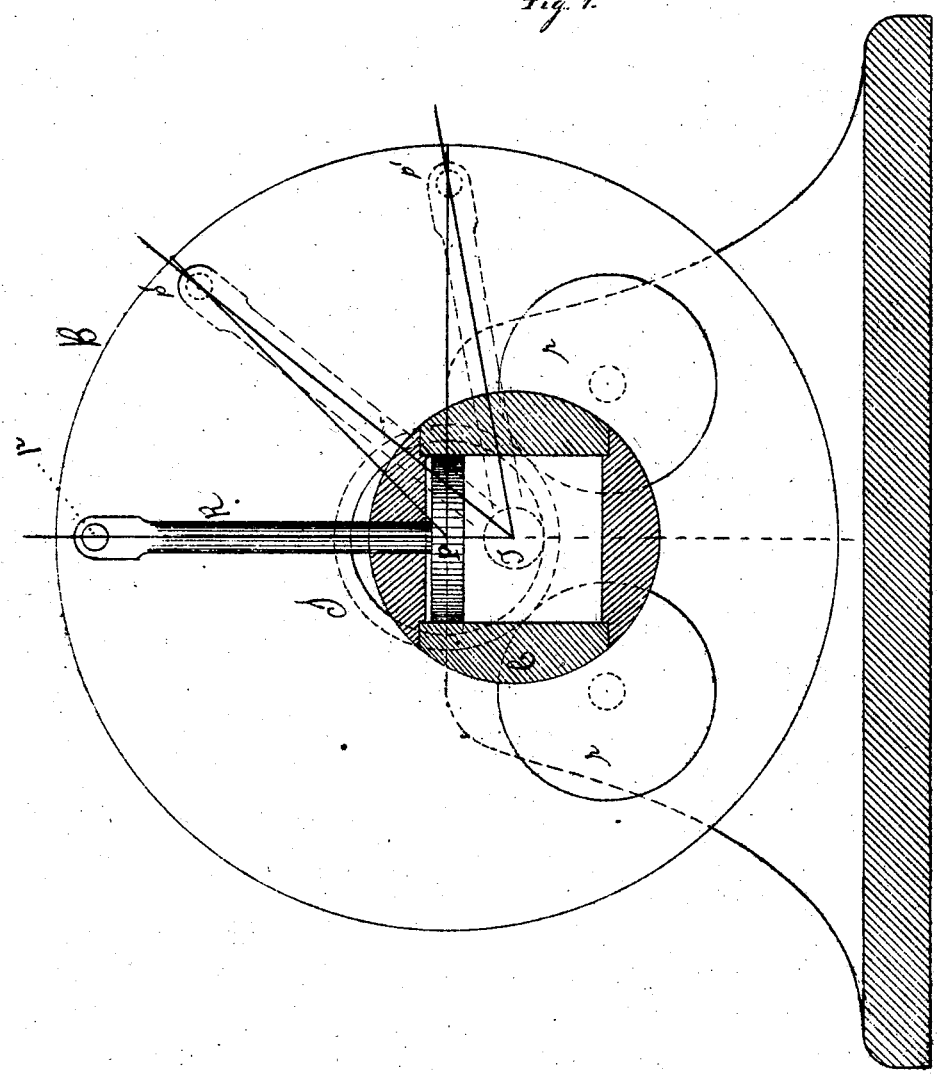

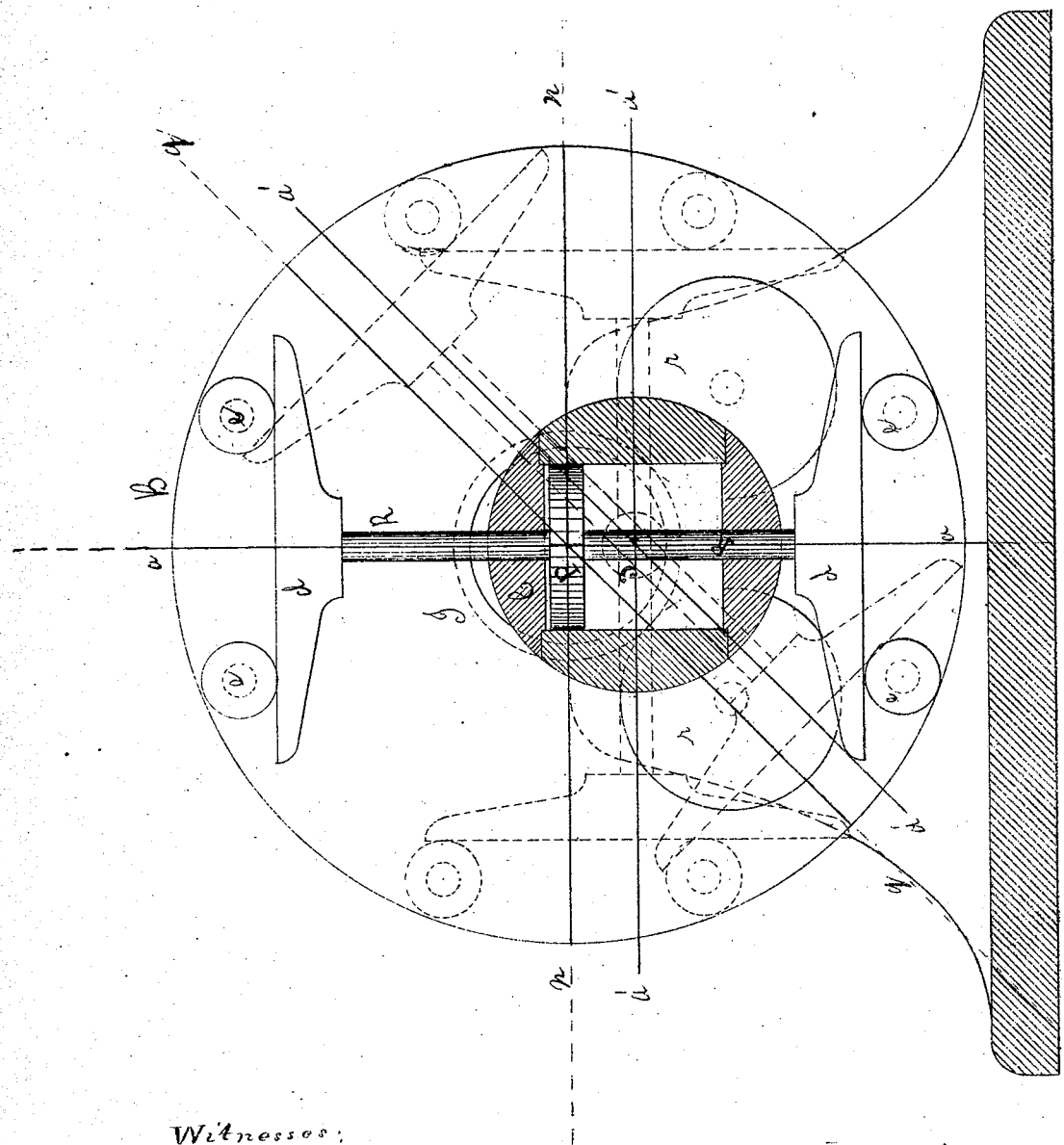

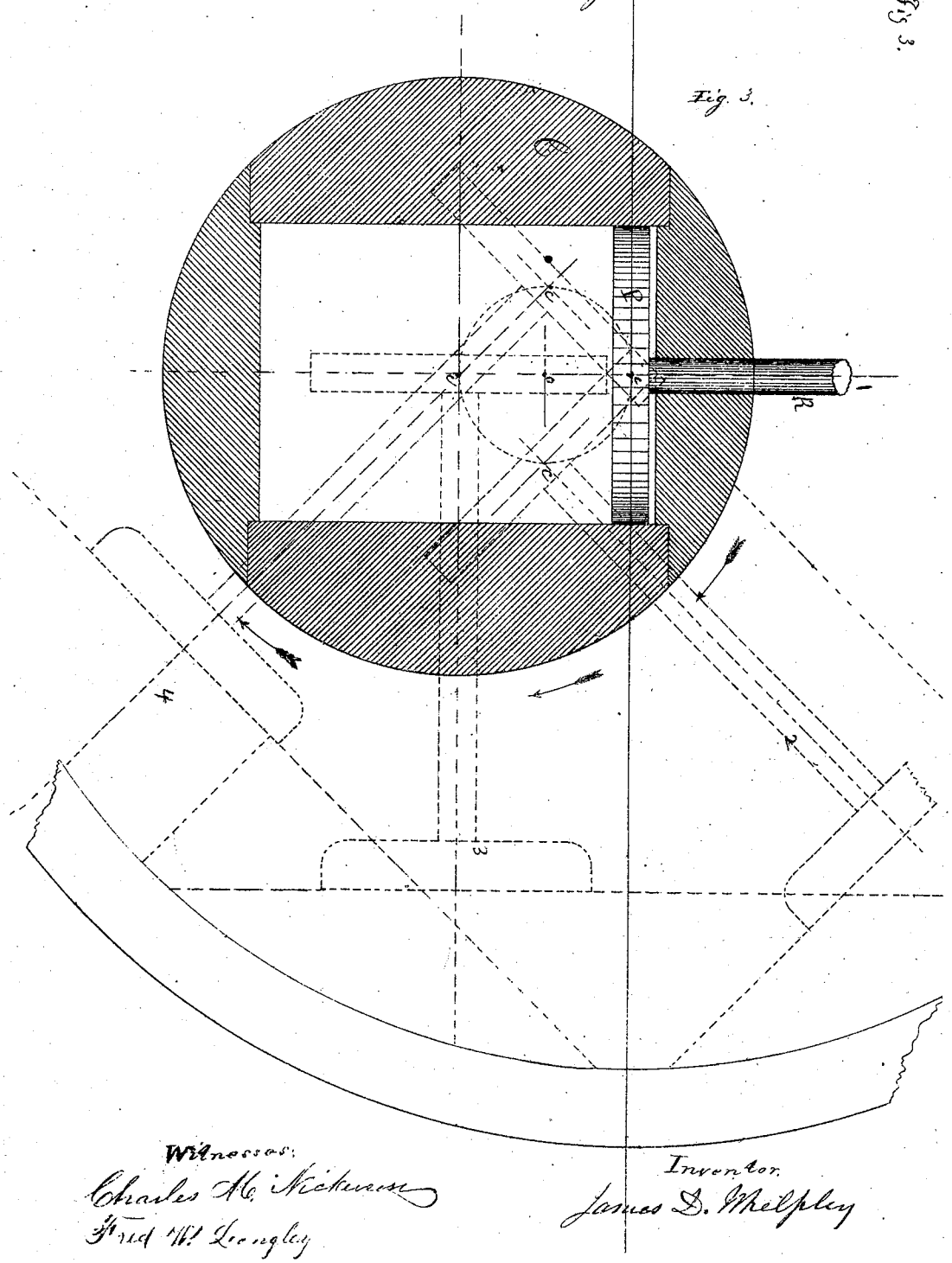

UNITED STATES PATENT OFFICE.

JAMES DAVENPORT WHELPLEY, OF BOSTON, MASSACHUSETTS.

IMPROVEMENT IN STEAM-ENGINES.

Specification forming part of Letters Patent No. 116,902, dated July 11, 1871.

*To all whom it may concern:*

Be it known that I, JAMES DAVENPORT WHELPLEY, of Boston, in the State of Massachusetts, have invented a new and useful Improvement in Steam-Engines, which the following specification and accompanying drawing sufficiently explain.

In my patent No. 83,427 I have described a mode of attaching the piston-rod of a piston reciprocating in a steam-cylinder, which revolves upon its trunnions, to the balance-wheel or abutment-ring of the same by means of a pin working in a joint, whereby the attached end of the piston-rod is made to give motion to the balance-wheel, acting at a fixed point in the circumference of the same, Fig. 1. It follows from this arrangement that the long axis of the revolving steam-cylinder $c$, Fig. 1, and piston-rod will be parallel with and coincide with the diameter of the balance-wheel B, Fig. 1, only when the engine is at either "dead-point." At all other times, during a revolution, the diameter of the balance-wheel, as may be seen in the drawing, Fig. 1, will form a more or less acute angle, $p'$ P T, Fig. 1, with the long axis of the piston-rod. In moving from one dead-point to the opposite dead-point during a half revolution the angle made by the two described lines will open to its extreme and close again. The opening of this angle will be measured as follows: Let the distance between the center of the balance-wheel P, Fig. 1, and the center of revolution of the cylinder T, Fig. 1, be the base of an acute-angle triangle, the first side of this triangle will be radius P $p'$, Fig. 1, of balance-wheel from point of attachment or pin to its center. The second side will be coincident with the axis of the piston-rod R, Fig. 1, in its several positions. The base and first side of the triangle are constant, not varying with the movement of the engine. The second or variable side T $p'$, Fig. 1, will pass through the center of revolution of the steam-cylinder and the connecting pin $p'$, Fig. 1. As the engine revolves this second side will be lengthened and shortened during each half revolution, representing the movement of the piston. The opening and closing of the angles of the triangle imply a variable velocity of revolution either in the balance-wheel or in the steam-cylinder, or in both of these, dividing the variation. In rotating from the dead-point through a half revolution the balance-wheel may move at first more rapidly than the cylinder until the full opening of the angle, and then slower than the same—provided the velocity of the cylinder be constant—until it reaches the second dead-point. This double variation is then repeated on the second half revolution, being four variations of velocity, divided in practice upon the different parts of the engine. A similar variation of momentums in heavy revolving machinery involves waste of power and the danger of rupture at high velocities. To correct this imperfection I propose to make the rotating movement of the balance-wheel and of the steam-cylinder synchronous and of equal velocity by the following device, Fig. 2: I discard the pin $p'$, Fig. 1, in the joint and the joint itself. To the end of the piston-rod R, Fig. 2, I affix firmly, at right angles and in frictional contact with an interior side or surface of the balance-wheel, a metallic cross-head or cross-bar, $d$, Fig. 2, more than equal in length to the cylinder. The outer edge or surface of this cross-head is made plain, and fits with a slight friction-pressure against an opposite plane friction-surface on the wheel; but for this friction-surface I may substitute trucks or rollers $e\ e$, Fig. 2. When the engine is at the dead-point, the piston-rod being perpendicular, each of the cross-heads will be midway in contact with the friction-surface of the rollers or trucks. In this construction the steam-propulsion or thrust of the piston and its cross-head, pressing alternately on the friction-surfaces of the balance-wheel, will give a revolving motion to the engine. But the free frictional opposition of the cross-head and rollers or friction-surface, allowing a lateral sliding and reciprocating motion of the cross-head, will maintain parallelism between the piston-rod and a diameter of the balance-wheel. This parallelism is represented by the two lines $a'\ a'$, $n\ n$, and $q\ q$, Fig. 2. The motion of the balance-wheel B, Fig. 2, and cylinder $c$, Fig. 2, must be always synchronous and equal with this arrangement of parts. If two wheels are associated mechanically so that their corresponding diameters are parallel while they revolve upon parallel axes, their equal radiuses will describe equal areas in equal times.

I find in practice that by the device above described the fault of unequal or variable momentums in the parts of the engine is corrected, with a sensible and adequate gain in power of work. It is possible to construct the engine with only a single cross-head or cross-bar attached to one extremity of the piston-rod, furnishing such a cross-head with a double set of trucks or friction-surfaces above and below.

In my patent, No. 83,427, of October 27, 1868, I describe a friction-cradle supporting the balance-wheel and maintaining its position in reference to the steam-cylinder. The third element of this cradle is a ring or rings, embracing some part of the cylinder and resting upon the interior periphery of some part of the balance-wheel. In place of this third element of the friction-cradle I have found it better to allow the trunnions T, Fig. 2, to rest directly upon the interior periphery I, Fig. 2, of the balance-wheel, interposing or not, as may be convenient, a small ring of metal, loosely embracing the neck of the trunnion to diminish friction. It is obviously possible to substitute for the pressure of the trunnions, or for the third or interior friction-ring embracing the cylinder, a third set of friction-rollers attached to a frame carried over the engine; this third set, pressing down upon some portion of the outer periphery of the balance-wheel, keeping it in place against the upward thrust of the piston. This device is a mechanical equivalent which I have found by actual trial to be of inferior value.

In Fig. 2, $r$ $r$, supported by the frame of the engine, represent the external elements of the friction-cradle co-operating with the downward pressure of the trunnion T to hold the balance-wheel B steadily in place. Fig. 3 represents several positions of the piston and cross-heads during the half revolution. Nos. 1, 2, 3, and 4 represent four positions of the piston. In positions 2, 3, and 4 are the cross-heads pressing against friction-planes, represented by the dotted lines, which are a portion of the balance-wheel itself.

C is the cylinder; R, the piston-rod in its first position; and P, the piston in its first position at the upper dead-point. It will be seen that during the revolution of the engine the center $c$ $c$ $c$ $c$ of the piston-rod and its attachments revolve in a perfect circle, of which the center $o$ is distant from the center of the cylinder one-quarter the length of the half stroke. It is evident, from an inspection of the movements, that the center of the piston will not, at any part of the revolution, descend below the center or axis of the cylinder, and that the usual interrupted momentums of reciprocation existing in the ordinary fixed cylinder of a stationary engine are converted into a constant centrifugal force.

What I claim, and desire to secure by Letters Patent of the United States, is—

1. The means, substantially as herein described, for giving the balance-wheel or abutment-ring and the cylinder revolving upon its trunnions a synchronous movement or equal velocity of revolution.

2. The substitution of friction-surfaces upon cross-heads and balance-wheel in apposition, with or without friction-rollers, permitting a lateral reciprocating motion of the cross-heads, in place of a permanent connection by pin, joint, or crank, substantially as and for the purposes described.

3. The introduction of friction-rollers attached to the balance-wheel in contact with the cross-heads or heads of the piston-rod, permitting the lateral reciprocating motion of the same, substantially as and for the purposes described.

4. The combination between the devices described for the maintenance of the synchronous movements described and the friction-cradle, substantially as and for the purposes described.

JAMES D. WHELPLEY.

Witnesses:
JACOB J. STORER,
CHARLES M. NICKERSON.